United States Patent
Haltiner, Jr. et al.

(10) Patent No.: US 7,306,872 B2
(45) Date of Patent: Dec. 11, 2007

(54) MODULAR FUEL CELL CASSETTE FOR FORMING A SOLID-OXIDE FUEL CELL STACK

(75) Inventors: Karl J. Haltiner, Jr., Fairport, NY (US); Subhasish Mukerjee, Rochester, NY (US); Lawrence A. Chick, West Richland, WA (US); Kerry D. Meinhardt, Kennewick, WA (US); Dean M. Paxton, Kennewick, WA (US); Vincent L. Sprenkle, Richland, WA (US); K. Scott Weil, Richland, WA (US); John E. Deibler, West Richland, WA (US); Paul E. George, II, Powell, OH (US); Kurtis P. Recknagle, Richland, WA (US)

(73) Assignees: Delphi Technologies, Inc., Troy, MI (US); Battelle Memorial Institute, Richland, WA (US)

( * ) Notice: Subject to any disclaimer, the term of this patent is extended or adjusted under 35 U.S.C. 154(b) by 420 days.

(21) Appl. No.: 11/027,095

(22) Filed: Dec. 30, 2004

(65) Prior Publication Data
US 2006/0147786 A1    Jul. 6, 2006

(51) Int. Cl.
H01M 2/00    (2006.01)
H01M 2/08    (2006.01)
(52) U.S. Cl. .......................................... 429/34; 429/36
(58) Field of Classification Search ................. 429/38, 429/44, 36, 32, 34
See application file for complete search history.

(56) References Cited

U.S. PATENT DOCUMENTS 6,670,068 B1    12/2003    Diez

2002/0048700 A1    4/2002    Virkar et al.
2002/0106548 A1    8/2002    Chung et al.
2003/0235746 A1    12/2003    Haltiner, Jr. et al.
2004/0265666 A1    12/2004    Weil et al.

FOREIGN PATENT DOCUMENTS

DE    1 187 243    3/2002
WO    03/036745    5/2003

OTHER PUBLICATIONS

European Search Report dated Feb. 26, 2007.

*Primary Examiner*—Patrick Joseph Ryan
*Assistant Examiner*—Thomas H. Parsons
(74) *Attorney, Agent, or Firm*—Paul L. Marshall

(57) ABSTRACT

A modular fuel cell cassette for use in assembling a fuel cell stack comprising a metal separator plate and a metal cell-mounting plate joined at their edges to form a hollow cassette. A fuel cell subassembly is attached to the mounting plate and extends through an opening in the mounting plate. The plates include openings to form chimney manifolds for supply and exhaust of fuel gas to the anode and air to the cathode. A conductive interconnect element extends from the fuel cell subassembly to make contact with the next cassette in a stack. The anode openings in the mounting plate and separator plate are separated by spacer rings such that the cassette is incompressible. A fuel cell stack comprises a plurality of cassettes, the mounting plate of one cassette being attached to, and insulated from, the separator plate of the next-adjacent cassette by a dielectric seal surrounding the interconnect.

17 Claims, 5 Drawing Sheets

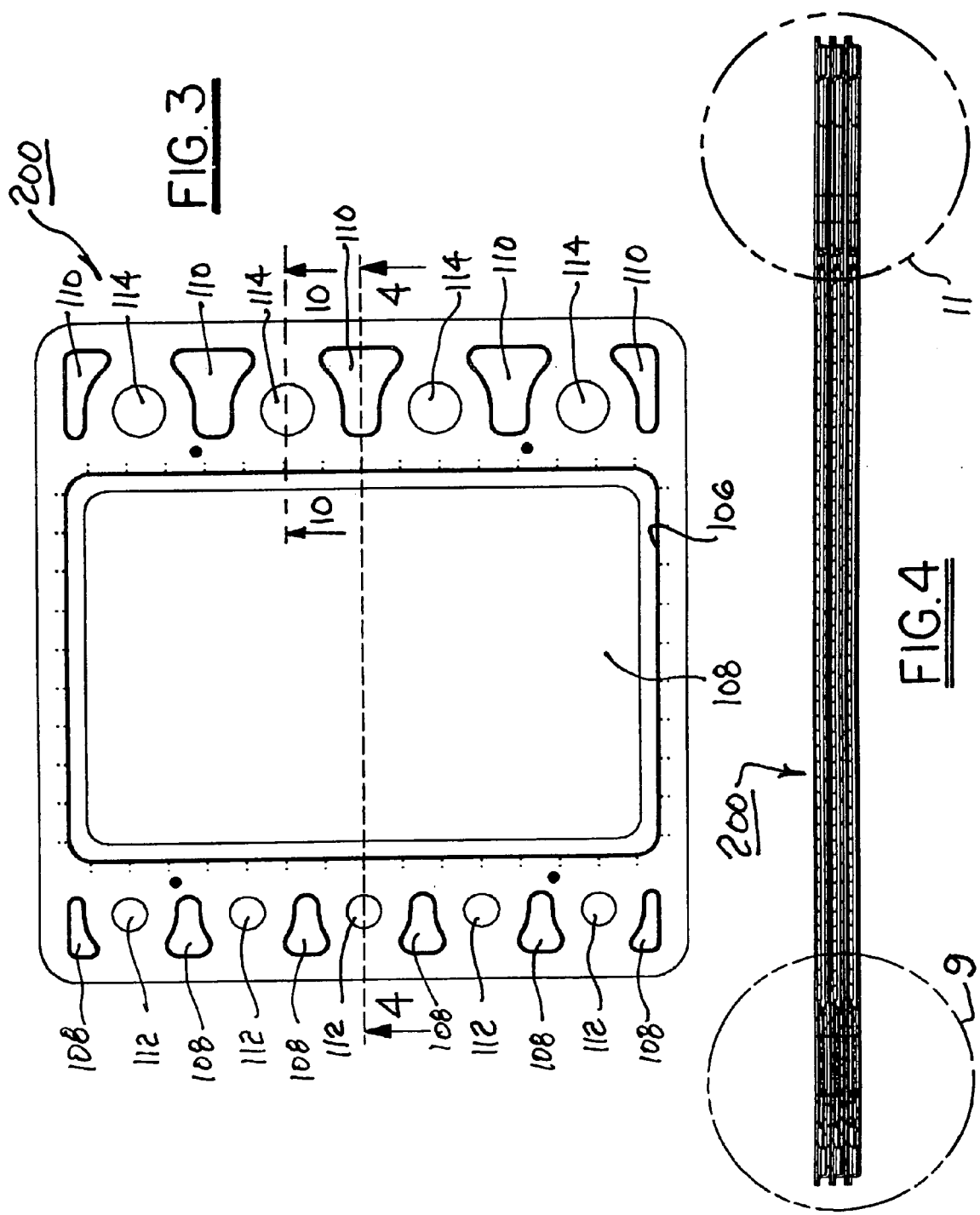

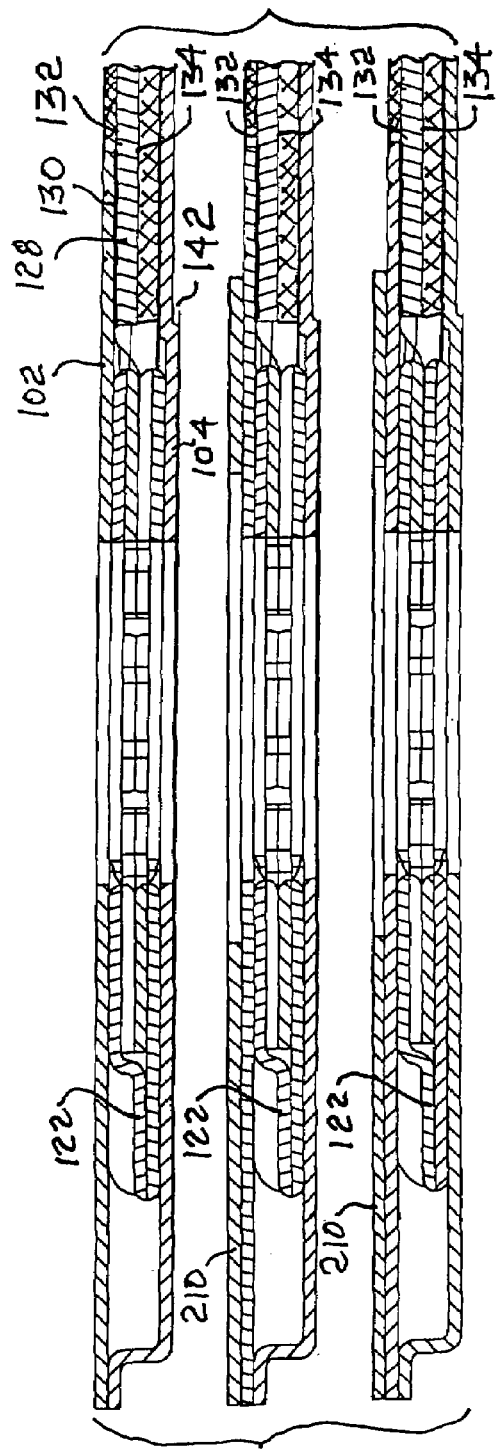
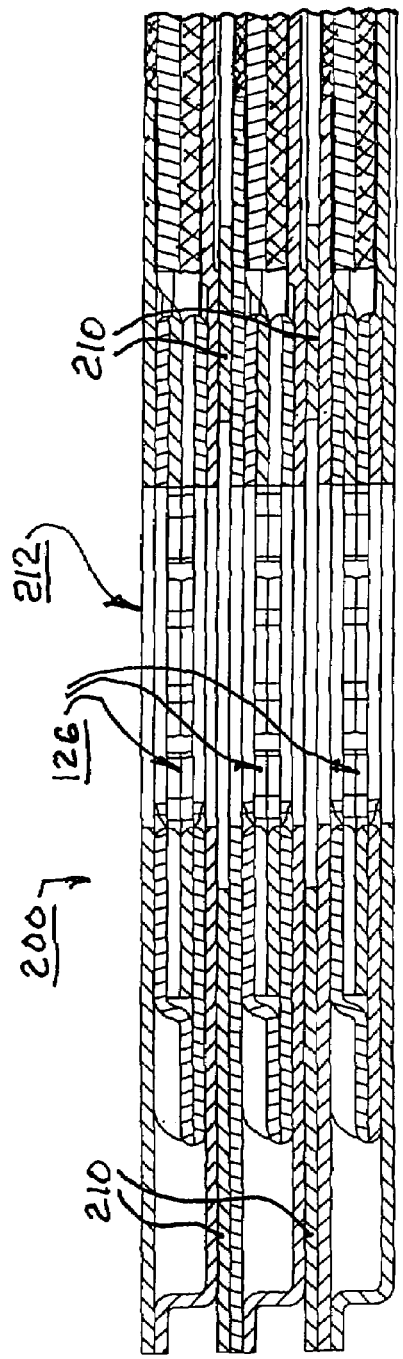

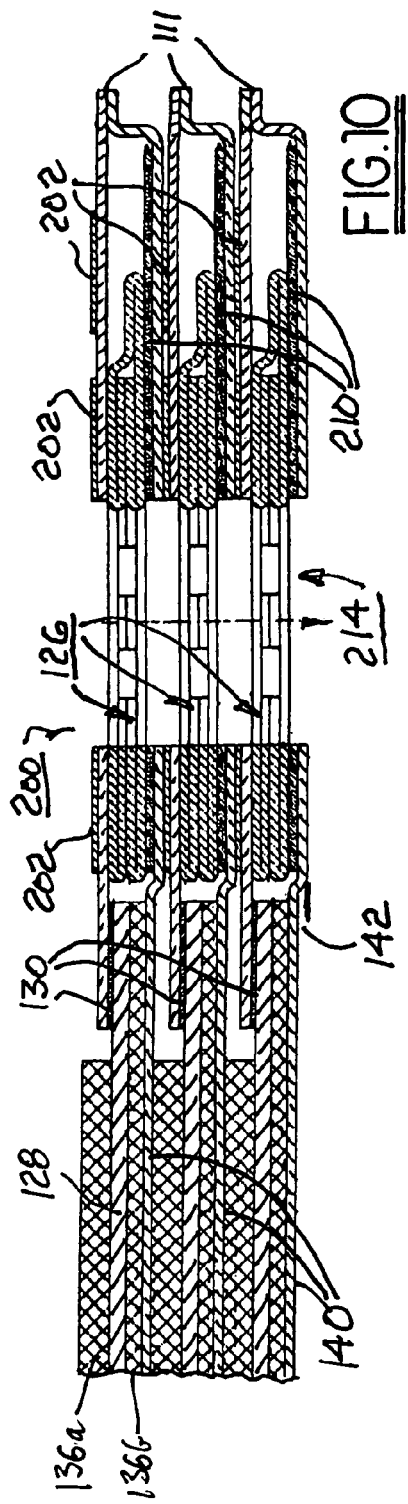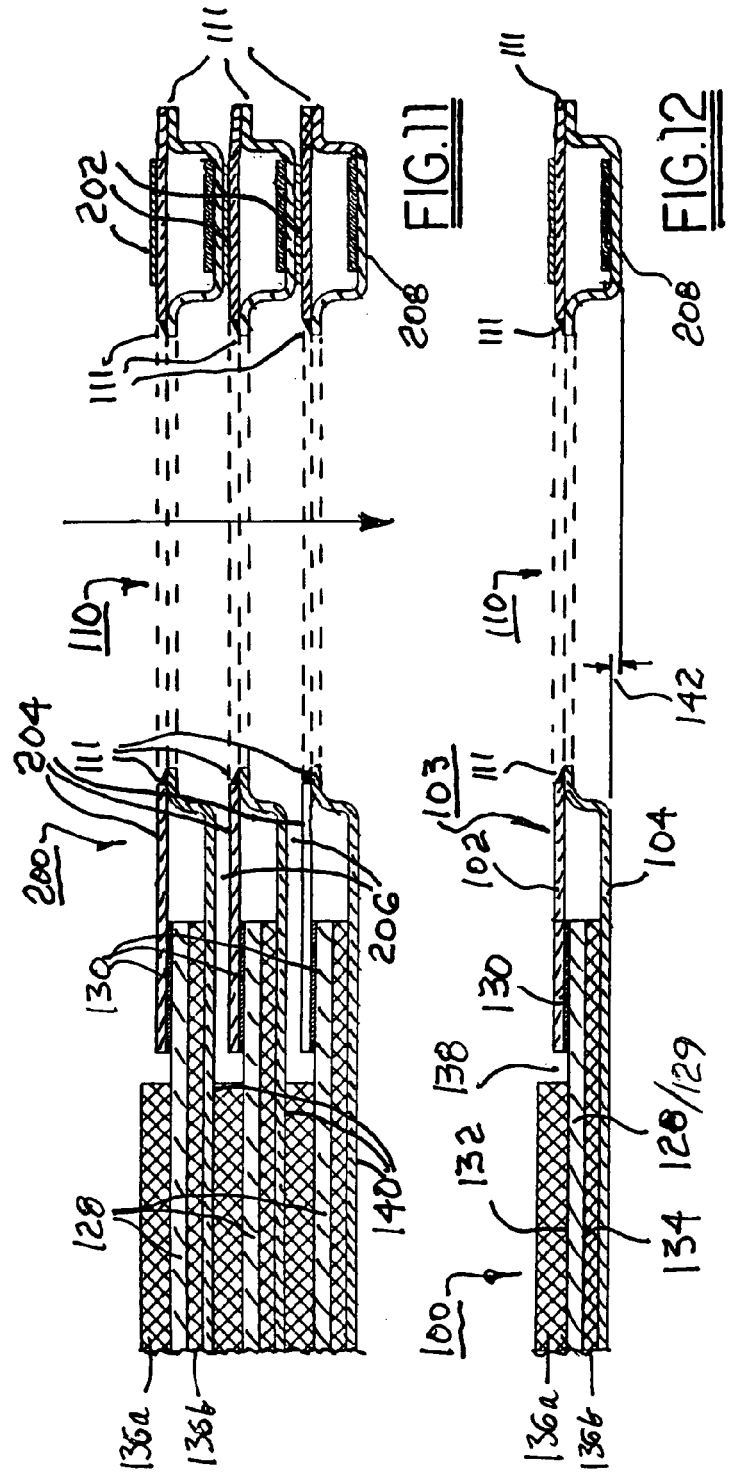

MODULAR FUEL CELL CASSETTE FOR FORMING A SOLID-OXIDE FUEL CELL STACK

This invention was made with United States Government support under Government Contract/Purchase Order No. DE-FC26-02NT41246. The Government has certain rights in this invention.

TECHNICAL FIELD

The present invention relates to fuel cells; more particularly, to solid-oxide fuel cells; and most particularly, to a modular fuel cell cassette for use in assembling a fuel cell stack.

BACKGROUND OF THE INVENTION

Fuel cells for combining hydrogen and oxygen to produce electricity are well known. A known class of fuel cells includes a solid-oxide electrolyte layer through which oxygen anions migrate; such fuel cells are referred to in the art as "solid-oxide" fuel cells (SOFCs).

In some applications, for example, as an auxiliary power unit (APU) for a transportation application, an SOFC is preferably fueled by "reformate" gas, which is the effluent from a catalytic liquid or gaseous hydrocarbon oxidizing reformer, also referred to herein as "fuel gas". Reformate typically includes amounts of carbon monoxide (CO) as fuel in addition to molecular hydrogen. The reforming operation and the fuel cell operation may be considered as first and second oxidative steps of the hydrocarbon fuel, resulting ultimately in water and carbon dioxide. Both reactions are preferably carried out at relatively high temperatures, for example, in the range of 700° C. to 1000° C.

A complete fuel cell stack assembly includes fuel cell subassemblies and a plurality of components known in the art as interconnects, which electrically connect the individual fuel cell subassemblies in series. Typically, the interconnects include a conductive foam or weave disposed in the fuel gas and air flow spaces adjacent the anodes and cathodes of the subassemblies.

In the prior art, a fuel cell stack is assembled typically by laying up the interconnects and the fuel cell subassemblies in a jig, forming repetitive fuel cell units. Typically, a fuel cell subassembly comprises a ceramic solid-oxide electrolyte layer and a cathode layer coated onto a relatively thick, structurally-significant anode element. In such a prior art assembly, each of the elements in the stack, including the fuel cell subassemblies, becomes a structural and load-bearing element of the stack.

This assembly process and final product are subject to several serious shortcomings. First, assembly is very time-consuming and labor intensive, and thus is expensive. Second, the fuel cell subassembly is relatively fragile and is easily damaged during stack assembly; however, damaged subassemblies cannot be detected and replaced until the entire stack has been assembled, resulting in very time-consuming and expensive rework procedures or scrapping defective assemblies. Third, the fuel cell subassembly is not structurally competent at operating temperatures and thus the stack is dimensionally and structurally unstable. Fourth, the individual elements, and especially the interconnects, are relatively thick, resulting in an undesirably large package for a complete assembly.

What is needed in the art is a means for assembling each fuel cell subassembly into a working configuration such that it can be functionally tested prior to final assembly into a fuel cell stack.

What is further needed in the art is a means for removing a fuel cell subassembly from the load-bearing structure of a fuel cell stack.

What is still further needed in the art is a means for reducing the thickness of each fuel cell repetitive unit in a fuel cell stack.

It is a principal object of the present invention to modularize the structure of a fuel cell stack, and thereby permit functional testing of each module prior to assembly into the stack; to remove the fuel cell subassembly from the load-bearing structure of the stack; to reduce the thickness of each repetitive unit in the stack; and to reduce the cost, difficulty, and complexity of mass-manufacturing fuel cell stack assemblies.

SUMMARY OF THE INVENTION

Briefly described, a modular fuel cell cassette for use in assembling a fuel cell stack is a sheet metal assembly comprising a metal separator plate and a metal cell-mounting plate so formed that when they are joined at their perimeter edges to form the cassette, a cavity is formed between them which can contain a gas stream that feeds a fuel cell subassembly attached within the cassette to the mounting plate. Outboard of the fuel cell subassembly, the separator plate and cell-mounting plate are perforated by openings to form chimney-type manifolds for feeding fuel gas to the anode and air to the cathode, and for exhausting the corresponding gases from the stack. The fuel cell subassembly is attached to, and insulated from, the mounting plate by a dielectric seal. The mounting plate includes an opening through which one of the electrodes is accessible, preferably the cathode, and through which a conductive interconnect element extends to make contact with the outer surface of the next-adjacent cassette in a stack. The anode openings in the mounting plate and separator plate are separated by spacer rings such that the cassette is incompressible. The rings include openings which allow fuel gas to flow from the anode supply chimney into the anode gas channel in the cassette. For the cathode, the edges of the cathode openings are formed similar to the perimeter of the cassette so that the edges are welded together.

In assembling a fuel cell stack from a plurality of cassettes, the mounting plate of one cassette is attached to, and insulated from, the separator plate of the next-adjacent cassette by a peripheral dielectric seal surrounding the interconnect extending from the mounting plate central opening. Thus, each cassette is at the voltage potential of the adjacent cell in a first direction by virtue of contact with its interconnect, and is insulated from the adjacent cell in the opposite direction by virtue of the peripheral dielectric seal. Thus, the cassettes are connected in electrical series and the supply and exhaust manifolds are formed inherently by the stack-assembly process.

BRIEF DESCRIPTION OF THE DRAWINGS

The present invention will now be described, by way of example, with reference to the accompanying drawings, in which:

FIG. 3 is a plan view of the fuel cell stack shown in FIG. 2

FIG. 4 is a cross-sectional view taken along line 4-4 in FIG. 3;

FIG. 8 is an exploded cross-sectional view of a portion of a fuel cell stack as shown in FIG. 9;

FIG. 9 is a cross-sectional view taken in circle 9 in FIG. 4;

FIG. 10 is a cross-sectional view taken along line 10-10 in FIG. 3;

FIG. 11 is a cross-sectional view taken in circle 10 in FIG. 4; and

FIG. 12 is a cross-sectional view of a portion of a cassette taken through a cathode air exhaust opening.

DESCRIPTION OF THE PREFERRED EMBODIMENTS

Figure 1:
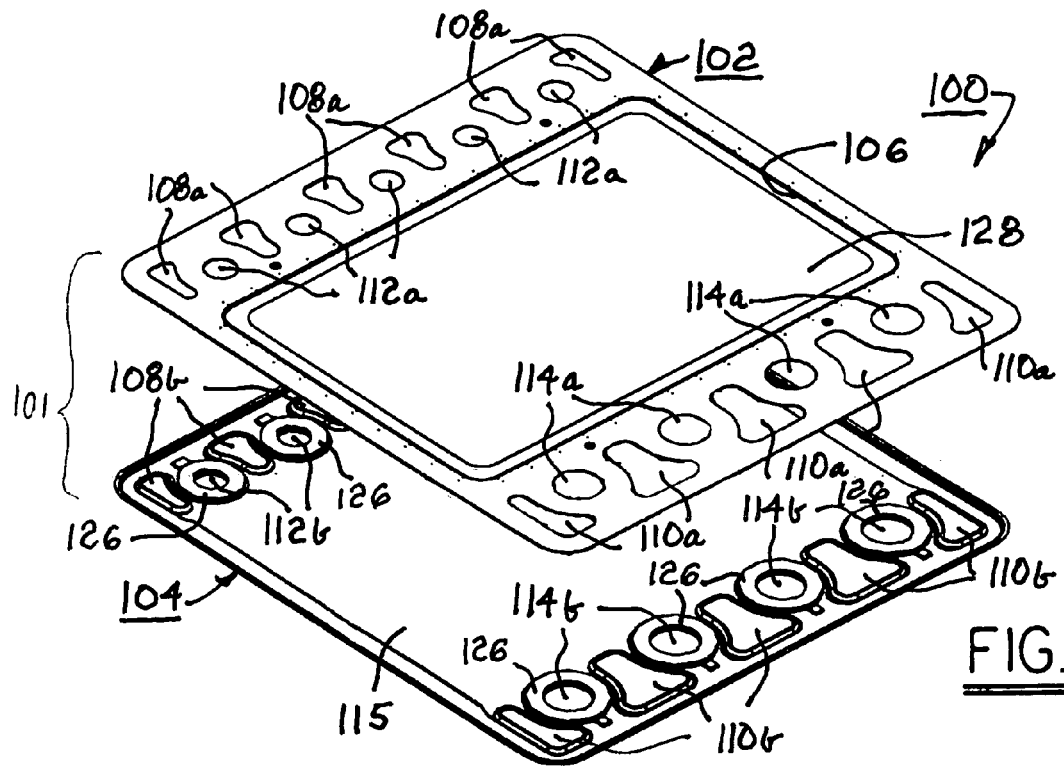
FIG. 1 is an exploded isometric view of a fuel cell cassette in accordance with the invention.
Figure 2:
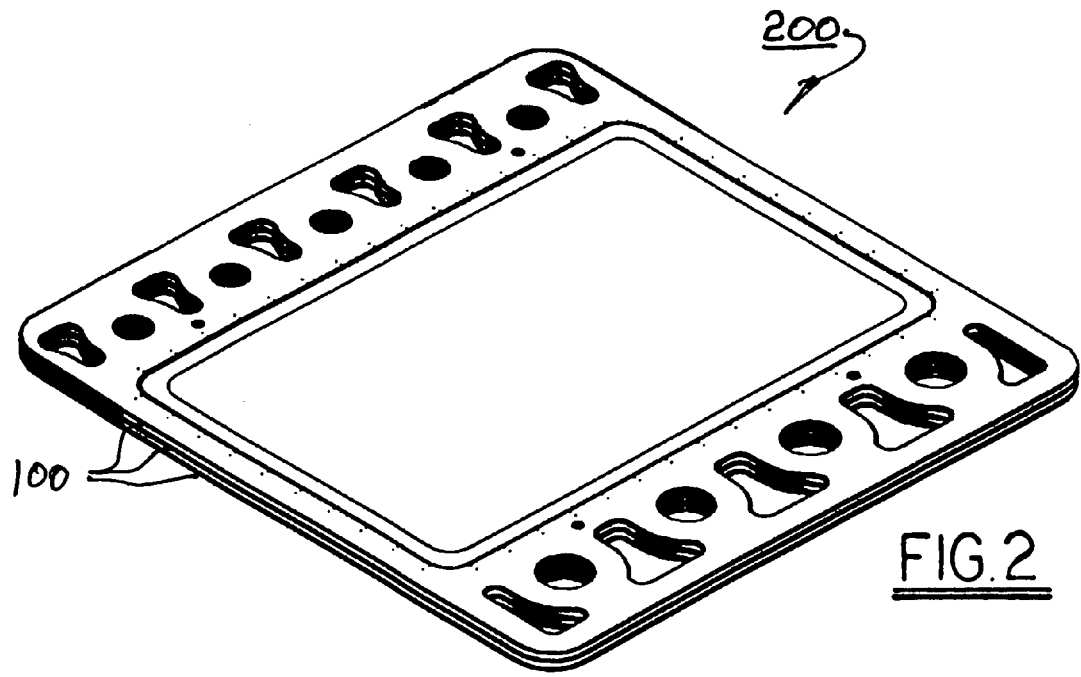
FIG. 2 is an isometric view of a fuel cell stack comprising three cassettes as shown in FIG. 1.
Figure 5:
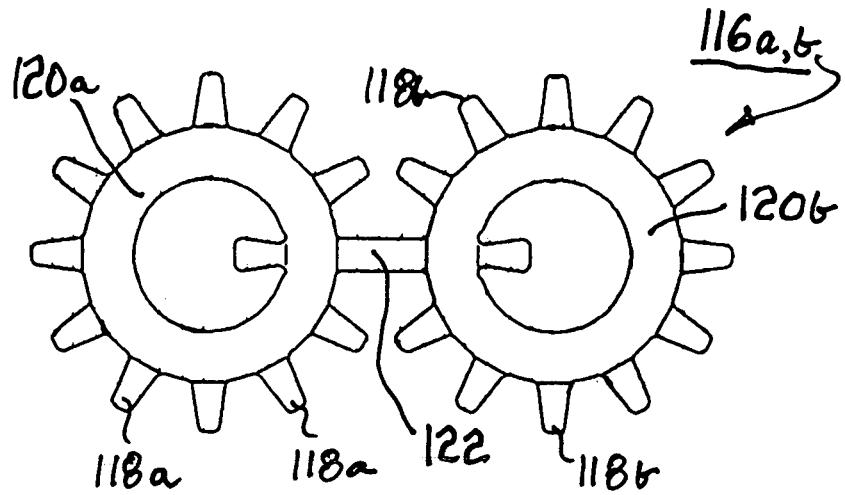
FIG. 5 is a plan view of a separation ring, as stamped from sheet stock, in accordance with the invention.
Figure 6:
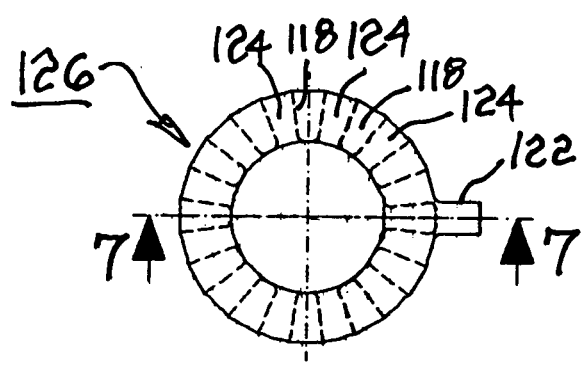
FIG. 6 is a plan view of the separation ring shown in FIG. 5, folded for use in a fuel cell cassette as shown in FIG. 1.
Figure 7:
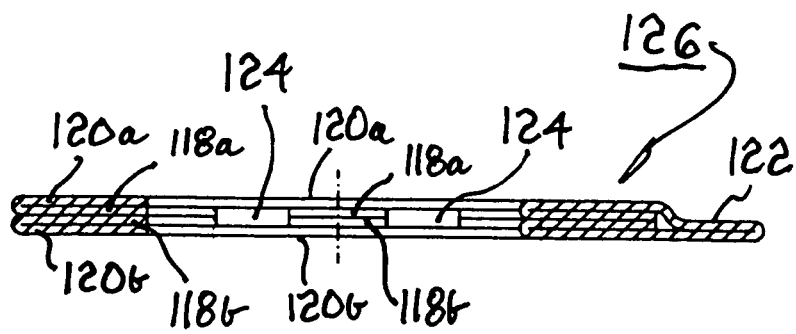
FIG. 7 is a cross-sectional view taken along line 7-7 in FIG. 6.

Referring to FIG. 1, a fuel cell cassette 100 in accordance with the invention includes a cassette housing 101 including a fuel cell mounting plate 102 and a separation plate 104. Mounting plate 102 includes a large central electrode opening 106 for receiving a fuel cell subassembly 128 as described below. Outboard of central electrode opening 106 are cathode air inlets 108a, cathode air outlets 110a, fuel gas inlets 112a, and fuel gas outlets 114a. Separation plate 104 is provide with similar and mating air and fuel openings 108b, 110b, 112b, and 114b, respectively. Separation plate 104 is formed as a shallow tray 115 such that a cavity is created between plates 102,104 for receiving fuel cell components and fuel gas as described below. Preferably, the mounting and separation plates are formed by stamping or drawing from thin sheet stock (0.1 to 1.0 mm) of a ferritic stainless steel, although other materials such as austenitic stainless steel or high temperature alloys may also be acceptable. During assembly, plates 102, 104 are joined to define a cassette housing (FIG. 12) by formation of a metallurgical bond 111 at their edges and around each of the air inlets and outlets (FIGS. 8-12) such that only openings 112, 114 have access to the interior of the cassette.

Referring to FIGS. 1 and 3-7, a spacer ring 126 is provided within the cassette for each fuel gas inlet 112a,b and each fuel gas outlet 114a,b. In a currently preferred embodiment for forming ring 126, a pair of rings 116a,b having radial tabs 118 extending from rings 120a,b are connected by a link 122. Radial tabs 118 are folded inward and line up with one another when the two rings 120a,120b are folded over at link 122 to form solid columns of metal. The spaces between the tabs form openings 124 which allow fuel gas to flow from the fuel gas inlets 112 into the anode gas channel (space contained within the cassette), and into the fuel gas outlets 114 from the anode gas channel. The folded rings 126 form solid metal spacers between mounting plate 102 and separator plate 104, thus defining and maintaining a constant spacing therebetween despite assembly and operational loads on the cassette. Preferably, rings 126 are formed by stamping from sheet materials similar to those disclosed for forming the mounting plate and separator plate.

Referring to FIGS. 1, 8, and 12, an anode-supported fuel cell subassembly 128 is a three-layer structure comprising a structural anode, a ceramic electrolyte, and a cathode. The anode and cathode are also referred to herein generically as electrodes 129. Such a fuel cell subassembly is well known in the art of solid oxide fuel cells. To assemble assembly 128 to mounting plate 102, the cathode material is stripped or omitted (such as by screen printing) from the borders of subassembly 128, the exposed ceramic electrolyte surface of which is then thermally bonded to mounting plate 102 via a dielectric seal 130 formed by brazing, a ceramic adhesive seal, or, preferably, glass. Thus, subassembly 128 is oriented such that the cathode surface 132 is exposed through central opening 106 and the anode surface 134 faces inwardly of the cassette housing. Further, the cathode electrode of subassembly 128 is thus electrically insulated from mounting plate 102.

The ceramic fuel cell subassembly 128 is preferably mounted to the mounting plate prior to cassette assembly although it can be done during the assembly process if desired.

Referring to FIGS. 8, 11, and 12, the spaces adjacent to cathode surface 132 and anode surface 134 serve two distinct functions: to allow passage of the appropriate reactive gases along the electrode surfaces, and to transmit electric current to and from the cell in known fashion. Each such space is filled with a conductive interconnect 136 that is porous or has passages formed into it to allow gas flow. Alternatively, an interconnect may have features formed into it, such as dimples or ribs, to make electrical contact. In a currently preferred embodiment, a metal mesh or foam interconnect 136 (cathode interconnect 136a and anode interconnect 136b) permits passage of gases along the electrodes and conducts current into and out of the cassette. Because of the corrosive nature of wet reformate on ferritic stainless steels at high temperatures, preferred materials for the interconnects are nickel mesh, a super-ferritic alloy such as Crofer 22 APU or a nickel-based superalloy such as Haynes 230 alloy. Note that cathode interconnect 136a is separated by a gap 138 from contact with mounting plate 102.

To complete the assembly of an individual cassette 100, rings 126 are positioned over anode inlet and exhaust openings 112b, 114b as shown in FIG. 1, interconnect 136b is positioned on separator plate 104, and mounting plate 102 bearing fuel cell element 128 is aligned with and placed over separator plate 104. The two plates 102, 104 are then metallurgically joined as by welding or brazing to form joints 111 as described above. The edges of the "keyhole" shaped cathode inlet and exhaust openings 108, 110 are formed similar to the perimeter of the cassette so that those edges are also laser welded together. This prevents cathode air from entering the anode gas channel (interior of the cassette), or anode gas leaking into the cathode air chimney/manifold.

Within the scope of the invention, the fuel cell subassembly may be oriented with either the cathode surface or the anode surface exposed through opening 106 in mounting plate 102. However, the currently preferred assembly configuration has the anode fuel gas stream and fuel cell subassembly 128 contained within the cassette, as shown in FIGS. 10-12. With this approach, the metallurgical bond joint 111 at the perimeter edges of the cassette and the bond joint 130 between the fuel cell element and the mounting plate are the critical sealing joints for containing the combustible fuel gas within the cassette and stack, which can be leak tested at room temperature before final assembly of the fuel cell stack. This approach significantly improves the quality of the stack manufacturing process and reliability of the stack assembly.

Note that the anode and cathode inlet and exhaust openings in the cassette can be arranged around the fuel cell subassembly in any one of three distinct configurations, only one of which is shown. The most common prior art configuration results in cross flow between the fuel gas direction across the anode and the air direction across the cathode. This is accomplished by arranging the cathode inlet and exhaust openings on two opposite edges of a rectangular cassette, and the anode inlet and exhaust openings on opposing edges adjacent to the edges occupied by the cathode openings. The two other basic configurations are co-flow and counter-flow. In the co-flow configuration (FIG. 1), the anode and cathode flows are parallel and in the same direction. In the counter-flow case, the flows are parallel but in opposite directions. The currently preferred design is co-flow, which has been demonstrated by computer modeling to have the best temperature and current distribution across the fuel cell element.

Referring to FIGS. 2-4 and 8-11, a fuel cell stack 200 is formed by literally stacking together a plurality of individual fuel cell cassettes 100. The cassettes are bonded together outboard of central opening 106 in a pattern surrounding the air and fuel gas inlets and exhausts using a fusible seal joint 202. The seal joint, preferably formed in place thermally, also serves as a dielectric isolator of the individual cassettes. One example of seal joint 202 is one formed using a glass-filled tape, which is fusible at high temperatures to provide a smooth, continuous, durable seal. Thus each cassette in the stack is at the potential of its anode, which is grounded to the separator plate and hence the mounting plate, plus whatever voltage is transferred from prior cassettes in the stack. The total voltage of the stack at any cassette is transferred to the next cassette via the cathode interconnect 136a which makes full contact with the outer surface 140 of the separator plate of the next cassette. The stack is terminated at opposite ends by conventional interconnect/terminals (not shown). Referring to FIGS. 10-12, it is seen that each separator plate 104 is drawn to two depths differing by a distance 142 so that when two cassettes are joined (mounting plate surface 204 of one cassette to the separator plate surface 208 of another cassette), a cavity is formed between them which provides an opening 206 for air to enter the cathode interconnect 136a and spread across cathode surface 132. Thus, the cathode air channel is the space formed between the cassettes. The separator plate is formed so that there is a flat ridge 208 around the perimeter of the separator plate that is on the same plane as the anode opening seal areas. Bonded joint seal 202 bonds/seals to this ridge and to the mounting plate surface 204 of the adjoining cassette. Therefore one cassette is sealed to the next cassette around the perimeter creating the cathode air channel and preventing cathode air from leaking out of the stack assembly. When the cassettes are stacked together, the cathode openings in the individual cassettes line up to form chimney-type manifolds for cathode air supply and return.

There are metal spacers 210 placed between and within the two halves of each cassette at the anode manifold openings 212, 214. Spacers 210 are formed with openings adjacent plate openings 112, 114 so that anode gas can flow through them but they are otherwise substantially solid which prevents the cassette from collapsing at elevated temperatures and supports the anode opening seal between the cassettes.

There are also bonded joint seals in the flat area around the perimeter of each anode opening (supply and exhaust) between adjoining cassettes (anode opening seal areas). Preferably, such a seal does not require a compressive load for sealing and electrically insulating and is also a structural joint able to sustain compressive loads. These seals prevent anode gas in the anode gas chimney/manifolds (supply and return) from leaking into the cathode air channel (or vice-versa).

In the preferred arrangement shown herein, the anode inlet and exhaust openings are round and are surrounded by a large flat surface, thereby reducing stress on the seal joint 202, and the large flat surfaces maximize the bond area. The result is a highly reliable and robust sealing joint for the passage of fuel gas from one cassette to the next.

The preferred assembly has the cathode air contained in the sealed space between the cassettes. This seal is more difficult to accomplish than the seals for the anode openings, but it is not critical because any leaks would be only harmless cathode air. In addition, if any leaks should form in the anode opening seals or in the cell to mounting plate joint, the leaked fuel is contained within the cathode air stream and is thus contained within the stack assembly, resulting in a higher level of safety.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A modular fuel cell cassette for use in forming a fuel cell stack, comprising:

a) a cassette housing comprising a mounting plate and a separator plate joined along mutual edges thereof to enclose a captive space, said mounting plate having an electrode opening formed therein;

b) a fuel cell subassembly comprising an electrode, said subassembly being mounted in said electrode opening such that a cathode surface of said electrode is exposed outside of said cassette and an anode surface of said electrode faces inwardly of said cassette housing;

c) inlet and outlet openings formed in said cassette housing for providing fuel gas to said anode surface and for removing fuel gas from said anode surface, respectively;

d) inlet and outlet openings formed in said cassette housing for providing air to said cathode surface and for removing air from said cathode surface, respectively; and e) a spacer disposed within said captive space outboard of said fuel cell subassembly and adjacent said fuel gas inlet openings for preventing collapse of said housing under load when assembled into said fuel cell stack, wherein said spacer includes:

a first ring having a plurality of first inwardly folded radial tabs; and a second ring having a plurality of second inwardly folded radial tabs, wherein said first and second plurality of inwardly folded radial tabs are lined up with one another and define openings to allow fuel gas to pass into said captive space to said anode surface.

2. A modular fuel cell cassette in accordance with claim 1 further comprising:
   a) a first electrical interconnect extending between said anode surface and an inner surface of said housing; and
   b) a second electrical interconnect disposed in contact with said cathode surface and extending from said electrode opening.

3. A modular fuel cell cassette in accordance with claim 2 wherein said first and second electrical interconnects are formed of a material selected from the group consisting of metallic nickel and a nickel-based alloy.

4. A modular fuel cell cassette in accordance with claim 1 wherein said gas inlet opening includes a plurality of gas inlet openings.

5. A modular fuel cassette in accordance with claim 1 wherein said air inlet opening includes a plurality of air inlet openings formed in said mounting plate and in said separator plate in first portions of said plates between said cathode opening and mutual edges thereof, and wherein said air outlet opening includes a plurality of air exhaust opening formed in said mounting plate and in said separator plate in second portions of said between said cathode opening and mutual edges thereof, said mounting plate openings and said separator plate openings being joined along their mutual edges to prevent entry of air into said housing, said housing being shaped to form an air passage on an outer surface thereof between adjacent of said cassettes in said fuel cell stack.

6. A modular fuel cell cassette in accordance with claim 1 wherein the area of said cathode surface is less than the area of said electrode opening.

7. A modular fuel cell cassette in accordance with claim 1 wherein said first and second rings are connected by a link.

8. A modular fuel cell cassette in accordance with claim 1 wherein said first and second plurality of inwardly folded radial tabs are in contact with one another.

9. A fuel cell stack comprising a plurality of modular fuel cell cassettes wherein each of said cassettes includes
   a cassette housing comprising a mounting plate and a separator plate joined along mutual edges thereof to enclose a captive space, said mounting plate having an electrode opening formed therein;
   a fuel cell subassembly comprising an electrode, said subassembly being mounted in said electrode opening such that a cathode surface of said electrode is exposed outside of said cassette and an anode surface of said electrode faces inwardly of said cassette housing;
   inlet and outlet openings formed in said cassette housing for providing fuel gas to said anode surface and for removing fuel gas from said anode surface, respectively;
   inlet and outlet openings formed in said cassette housing for providing air to said cathode surface and for removing air from said cathode surface, respectively; and
   a spacer disposed within said captive space outboard of said fuel cell subassembly and adjacent said fuel gas inlet openings for preventing collapse of said housing under load when assembled into said fuel cell stack, wherein said spacer includes:
   a first ring having a plurality of first inwardly folded radial tabs; and
   a second ring having a plurality of second inwardly folded radial tabs, wherein said first and second plurality of inwardly folded radial tabs are lined up with one another and define openings to allow fuel gas to pass into said captive space to said anode surface.

10. A fuel cell stack in accordance with claim 9 wherein each of said plurality of cassettes includes openings for passing fuel gas and air therethrough, and wherein said openings are aligned in said stack to form chimney manifolds for supplying and exhausting said fuel gas and said air to and from said plurality of cassettes.

11. A fuel cell stack in accordance with claim 9 wherein adjacent modular cassettes are joined and sealed together by a bonded seal joint.

12. A fuel cell stack in accordance with claim 11 wherein said bonded seal joint includes a glass.

13. A modular fuel cell cassette for use in forming a fuel cell stack, comprising:
   a) a cassette housing comprising a mounting plate and a separator plate joined along mutual edges thereof to enclose a captive space, said mounting plate having an electrode opening formed therein;
   b) a fuel cell subassembly comprising an electrode, said subassembly being mounted in said electrode opening such that a cathode surface of said electrode is exposed outside of said cassette and an anode surface of said electrode faces inwardly of said cassette housing;
   c) inlet and outlet openings formed in said cassette housing for providing fuel gas to said anode surface and for removing fuel gas from said anode surface, respectively;
   d) inlet and outlet openings formed in said cassette housing for providing air to said cathode surface and for removing air from said cathode surface, respectively; and
   e) a spacer disposed within said captive space outboard of said fuel cell subassembly and adjacent said fuel gas outlet openings for preventing collapse of said housing under load when assembled into said fuel stack, wherein said spacer includes:
   a first ring having a plurality of first inwardly folded radial tabs; and
   a second ring having a plurality of second inwardly folded radial tabs, wherein said first and second plurality of inwardly folded radial tabs are lined up with one another and define openings to allow fuel gas to pass from said captive space into said fuel gas outlet openings.

14. A modular fuel cell cassette in accordance with claim wherein said gas outlet opening includes a plurality of gas exhaust openings.

15. A modular fuel cell cassette for use in forming a fuel cell stack, comprising:
   a) a cassette housing comprising a mounting plate and a separator plate joined along mutual edges thereof to enclose a captive space, said mounting plate having an electrode opening formed therein;
   b) a fuel cell subassembly comprising an electrode, said subassembly being mounted in said electrode opening such that an anode surface of said electrode is exposed outside of said cassette and a cathode surface of said electrode faces inwardly of said cassette housing;
   c) inlet and outlet openings formed in said cassette housing for providing fuel gas to said anode surface and for removing fuel gas from said anode surface, respectively;
   d) inlet and outlet openings formed in said cassette housing for providing fuel said cathode surface and for removing air from said cathode surface, respectively; and
   e) a spacer disposed within said captive space outboard of said fuel cell subassembly and adjacent said air inlet openings for preventing collapse of said housing under load when assembled into said fuel cell stack, wherein said spacer includes:
  a first ring having a plurality of first inwardly folded radial tabs; and
  a second ring having a plurality of second inwardly folded radial tabs, wherein said first and second plurality of inwardly folded radial tabs are lined up with one another and define openings to allow air to pass into said captive space to said cassette surface.

16. A modular fuel cell cassette for use in forming a fuel cell stack, comprising:
  a) a cassette housing comprising a mounting plate and a separator plate joined along mutual edges thereof to enclose a captive space, said mounting plate having an electrode opening formed therein;
  b) a fuel subassembly comprising an electrode, said subassembly being mounted in said electrode opening such that an anode surface of said electrode is exposed outside of said cassette and a cathode surface of said electrode faces inwardly of said cassette housing;
  c) inlet and outlet openings formed in said cassette housing for providing fuel gas to said anode surface and for removing fuel gas from said anode surface, respectively;
  d) inlet and outlet openings formed in said cassette housing for providing air to said cathode surface and for removing air from said cathode surface, respectively; and
  e) a spacer disposed within said captive space outboard of said fuel cell subassembly and adjacent said air outlet openings for preventing collapse of said housing under load when assembled into said fuel cell stack, wherein said spacer includes:
    a first having a plurality of first inwardly folded radial tabs; and
    a second ring having a plurality of second inwardly folded radial tabs, wherein said first and second plurality of inwardly folded radial tabs are lined up with one another and define openings to allow air to pass from said captive space into said air outlet openings.

17. A spacer for a modular fuel cell cassette, wherein said modular fuel cell cassette includes a cassette, wherein said modular fuel cell cassette includes a cassette housing having a mounting plate and a separator plate joined together to enclose a captive space, and wherein the modular fuel cassette further includes a fuel cell subassembly mounted to said cassette housing and exposed to said captive space, said spacer disposed in said captive space and comprising:
  a first ring having a plurality of first inwardly folded radial tabs; and
  a second ring having a plurality of second inwardly folded radial tabs, wherein said first and second plurality of inwardly folded radial tabs are lined up with one another and define a plurality of openings to allow one of fuel gas and air to pass into said captive space and for preventing collapse of said cassette housing under load when assembled into a fuel cell stack.

* * * * *